United States Patent [19]

Pielet et al.

[11] Patent Number: 4,666,515

[45] Date of Patent: May 19, 1987

[54] METHOD FOR ADDING BISMUTH TO STEEL IN A LADLE

[75] Inventors: Howard M. Pielet, Munster; Nassos A. Lazaridis, Dyer; Robert D. O'Neil, Crown Point, all of Ind.

[73] Assignee: Inland Steel Company, Chicago, Ill.

[21] Appl. No.: 863,324

[22] Filed: May 15, 1986

[51] Int. Cl.⁴ .......................... C22C 33/08; C22B 9/00
[52] U.S. Cl. ............................................ 420/85; 75/96
[58] Field of Search .......................... 75/129.96, 130 R

[56] References Cited

U.S. PATENT DOCUMENTS

| | | | |
|---|---|---|---|
| 3,516,821 | 6/1970 | Neu | 75/96 |
| 3,673,004 | 6/1972 | Dumitrescu | 75/130 R |
| 3,762,915 | 10/1973 | Heine | 75/130 R |
| 4,244,737 | 1/1981 | Holowaty | 75/129 |
| 4,247,326 | 1/1981 | Quinto | 75/129 |
| 4,255,188 | 3/1981 | Riekels | 75/129 |

*Primary Examiner*—Peter D. Rosenberg
*Attorney, Agent, or Firm*—Marshall, O'Toole, Gerstein, Murray & Bicknell

[57] ABSTRACT

Bismuth is added to molten steel in a ladle, and the molten steel is covered with a slag layer sufficiently thick to prevent a decrease in the bismuth content during the time the molten steel is in the ladle.

11 Claims, No Drawings

METHOD FOR ADDING BISMUTH TO STEEL IN A LADLE

BACKGROUND OF THE INVENTION

The present invention relates generally to methods for adding alloying ingredients to molten steel and more particularly to a method for adding bismuth to molten steel in a ladle.

Bismuth is added to steel as an alloying ingredient to improve the machinability of the steel. In a typical steel-making operation, molten steel from a steel-making furnace is introduced into a ladle from which the molten steel is then introduced into ingot molds or, in the case of a continuous casting operation, into a tundish. Alloying ingredients may be added to the molten steel outside of the steel-making furnace, either in the ladle or as the steel is being introduced into an ingot mold or tundish.

Bismuth may be added to steel in the form of shot. Bismuth has been added to steel as the molten steel is introduced into an ingot mold, and bismuth may be added to molten steel as the latter is being introduced into a tundish. It is normally desirable to add alloying ingredients to the molten steel in the ladle because, in theory at least, when so added, the alloying ingredient should be more uniformly distributed throughout the entire volume of steel contained in the ladle than would be the case if the alloying ingredient were added to the same volume of steel as the latter was being introduced into the ingot molds or into the tundish. In other words, the result of a ladle addition should be an unchanging percentage of alloying ingredient in the molten steel, from the beginning until the end of the withdrawal of the molten steel from the ladle.

In the case of bismuth, however, a problem arises when bismuth is added to molten steel in the ladle. This problem, known as bismuth "fade", is reflected by a decreasing bismuth content in the molten steel during the time the molten steel is being withdrawn from the ladle. In other words, after the bismuth has been added, the steel withdrawn from the ladle at the beginning of the withdrawal or casting period has a higher bismuth content than the steel withdrawn from the ladle at the end of the casting period, and there is a declining percentage in the bismuth content from beginning to end of the casting period.

It has been determined that the problem of bismuth fade is due to a vaporization of bismuth at the surface of the molten steel in the ladle followed by an oxidation of the bismuth vapor producing a fume which is then carried away from the ladle by the exhaust system normally associated with the ladle. The bismuth vapor which has been oxidized and carried away by the exhaust system is replenished at the surface of the molten steel in the ladle by a transport of bismuth upwardly through the molten steel to the surface thereof. Bismuth transport probably occurs on an atomic level and constitutes a diffusion or migration of bismuth atoms upwardly through the molten steel to the surface thereof.

The amount of bismuth vapor is reflected by the partial pressure due to bismuth. The partial pressure due to bismuth, which is a measure of the tendency of bismuth to vaporize, increases with an increase in the temperature at the surface of the bismuth-containing molten steel.

When bismuth vapor is oxidized, the partial pressure due to bismuth is lowered. As this occurs there is a tendency for the bismuth contained within the molten steel to vaporize so as to compensate for the depletion of the bismuth vapor and attempt to maintain the partial pressure due to bismuth at the equilibrium level for the particular temperature then existing at the surface of the molten steel. However, the bismuth vapor above the molten steel is oxidized as fast as it is replenished from within the molten steel which in turn causes a gradual depletion of the bismuth content in the molten steel in the ladle, i.e. bismuth fade.

SUMMARY OF THE INVENTION

In accordance with the present invention, bismuth may be added to molten steel in the ladle without the occurrence of any substantial bismuth fade. This is accomplished by reducing the transport rate of bismuth from the molten steel to the atmosphere above the molten steel in the ladle and by reducing the partial pressure due to bismuth, above the molten steel. The latter expedient involves reducing the bismuth concentration at a location above the top of the molten steel to less than that existing at the top of the molten steel and reducing the temperature of the bismuth at the time it contacts the atmosphere to a temperature substantially below that existing at the top of the molten steel. The temperature of the molten steel in the ladle is typically about 1540° C. (2804° F.) or higher.

The steps of reducing the partial pressure due to bismuth and reducing the transport rate comprise covering the surface of the molten steel with a slag layer of sufficient thickness to perform these steps. Typically the slag layer is thick enough so that the top of the slag layer cools and forms a crust.

The slag layer dilutes or substantially reduces the bismuth concentration, at a location between the top of the molten steel and the atmosphere above the slag layer, to less than the bismuth concentration existing at the top of the molten steel, and this reduces the partial pressure due to bismuth, above the slag layer, to less than that which would exist above the molten steel absent the slag layer.

The slag layer also substantially reduces the temperature of the bismuth as it undergoes transport through the slag layer. The temperature of the bismuth, at the time it contacts the atmosphere above the slag layer, corresponds substantially to the temperature of the slag layer at its top surface, and this is substantially below the temperature existing at the top of the molten steel. Because of the lower bismuth temperature, the resulting partial pressure due to bismuth, above the slag layer, is less than that which would exist above the molten steel absent the slag layer.

Another expedient for reducing bismuth vaporization is to reduce the ratio of surface area to volume of the bismuth-containing molten steel in the ladle.

Other features and advantages are inherent in the method claimed and disclosed or will become apparent to those skilled in the art from the following detailed description.

DETAILED DESCRIPTION

In accordance with the present invention, bismuth may be added to any steel to which bismuth has heretofore been added, for example. Typical compositions of steel containing bismuth added for machinability increasing purposes are disclosed in Bhattacharya et al. U.S. Pat. No. 4,255,187, and the disclosure therein with respect to bismuth-containing steel compositions is incorporated herein by reference. A bismuth-containing steel has a composition typically within the following range:

| Ingredient | Wt. % |
| --- | --- |
| carbon | 0.06–1.0 |
| manganese | 0.3–1.6 |
| silicon | 0.30 max. |
| sulfur | 0.03–0.50 |
| phosphorus | 0.12 max. |
| bismuth | 0.05–0.40 |
| iron | essentially the balance |

Molten steel to which bismuth is to be introduced may be made in either an electric furnace or a basic oxygen furnace, for example. Molten steel from the furnace is poured into a ladle, and bismuth, in the form of shot, is added to the molten steel as the latter is being introduced into the ladle. Bismuth shot may also be injected below the surface of the molten steel in the ladle after the ladle is full. If desired, the molten steel may be stirred in the ladle, after the alloying ingredients have been added, by injecting a stirring gas, such as argon or nitrogen, into the ladle through a porous plug in the ladle bottom or through an injection lance, for example.

Bismuth recovery is about 50% when a method in accordance with the present invention is practiced. Thus, assuming a final, desired bismuth content of 0.25 wt. %, the amount of bismuth shot initially added to the molten steel in the ladle should correspond to a bismuth content of about 0.50 wt. %, compared to the weight of the molten steel in the ladle.

The molten steel in the ladle is covered as quickly as is feasible with a layer of slag having a composition which enables it to solidify at a temperature in the range of about 1300°–1400° C. (2372°–2552° F.). The slag layer should be thick enough, e.g. at least about 2 in. (51 mm.), so that the top of the slag layer cools and forms a crust.

The slag layer reduces the transport rate of bismuth from the molten steel to the atmosphere above the molten steel in the ladle, and it reduces the partial pressure due to bismuth, above the molten steel.

The slag layer reduces the tendency of the bismuth in the molten steel to vaporize, in two different ways. First, the slag layer dilutes or substantially reduces the bismuth concentration, at a location between the top of the molten steel and the atmosphere above the slag layer, to less than the bismuth concentration existing at the top of the molten steel. This reduces the partial pressure due to bismuth, above the slag layer, to less than that which would exist above the molten steel absent the slag layer.

In addition, the slag layer is thick enough so that at least the upper part thereof has solidified. There is thus a decreasing temperature from the bottom to the top of the slag layer, and the magnitude of the decrease is substantial. This cools the bismuth substantially as it undergoes transport through the slag layer, so that the temperature of the bismuth at the time it contacts the atmosphere above the slag layer is substantially below the temperature existing at the top of the molten steel.

For example, the temperature of the molten steel in the ladle is about 1540° C. (2804° F.), and the temperature of the bismuth at the top of the molten steel is about the same. The slag layer, however solidifies at a temperature typically in the range 1300°–1400° C. (2372°–2552° F.). At the time it contacts the atmosphere, the bismuth has been cooled to a temperature substantially no greater than the solidification temperature of the slag which is substantially below the temperature of the molten steel in the ladle. Thus, if the slag has a solidification temperature of about 1400° C. (2552° F.), the temperature of the bismuth at the time it contacts the atmosphere is no greater than about 1400° C. Similarly, if the temperature at which the slag solidifies is no greater than about 1300° C. (2372° F.), the temperature of the bismuth at the time it contacts the atmosphere is no greater than about 1300° C.

Because the lower the bismuth temperature, the lower the partial pressure due to bismuth, the partial pressure due to bismuth, above the slag layer, is substantially less than that which would exist above the molten steel absent the slag layer.

In addition to reducing the partial pressure due to bismuth, the slag layer also reduces the transport rate of the bismuth. This is because the slag layer is thick enough to have solidified at its top surface and for some depth below. As a result, the rate at which the bismuth diffuses or migrates upwardly to the top of the slag layer is substantially slowed down, compared to the bismuth transport rate in molten steel.

Examples of slag compositions which may be applied to the top of the molten steel in the ladle, in accordance with embodiments of the present invention, are set forth below, in wt. %.

| Ingredient | Example A | Example B |
| --- | --- | --- |
| MnO | 20–35 | 20–40 |
| CaO | 20–35 | 17–30 |
| $Al_2O_3$ | 5–10 | 6–14 |
| $SiO_2$ | 7–18 | — |
| FeO | 7–20 | 6–12 |
| MgO | 5–7 | 4–7 |
| $Cr_2O_3$ | 0.1–1.0 | — |
| $P_2O_5$ | 0.5–1.0 | — |
| S | 2–3.5 | — |

For lower manganese steels (e.g. 0.3 to 0.6 wt. % Mn), the MnO content will be much less, e.g. 2–10 wt. %. For aluminum killed steel, the $Al_2O_3$ content may be higher (e.g. up to 30 wt. %). For silicon killed steel, the $SiO_2$ content may be higher (e.g. up to 30 wt. %). For deoxidized steel (e.g. under 50 ppm $O_2$ in the ladle), the FeO content will be in the range 1–5 wt. %. For low sulfur steel (less than 0.03 wt. % S), the sulfur content of the slag will be in the range 0.5–2.0 wt. %.

In another embodiment of the invention, not only is the surface of the molten steel covered with a slag layer, as described above, but also, the ladle is constructed in such a manner that the ratio of surface area to volume of the bismuth-containing molten steel in the ladle, before the ladle is tapped, is no greater than about 0.8 $m^2/m^3$ (0.25 $ft.^2/ft.^3$). By reducing the ratio of surface area to volume of the bismuth-containing molten steel in the ladle, in the manner described above, the opportunity of the bismuth to vaporize is reduced.

Typical ladle weight capacities are in the range 120–300 tons (109 to 330 Mg).

In a typical operation employing a method in accordance with the present invention, molten steel from a basic oxygen furnace is tapped into a ladle at a temperature of about 2870° F. (1577° C.) or slightly higher. Bismuth shot, typically having a size less than 1 mm. in diameter (18-20 mesh) is added to the furnace tap stream employing conventional addition equipment, with the bismuth being added evenly from the time the ladle is about ¼ full to the time the ladle is about ¾ full. Other alloying ingredients conventionally added to molten steel in a ladle may be added contemporaneously. The molten steel is covered with the desired slag layer as quickly as possible once the ladle has been filled with molten steel to the desired level. The slag employed may be furnace slag from the same furnace as that containing the molten steel introduced into the ladle, or an artificial slag may be employed. A typical weight for the molten steel in the ladle, after the ladle has been filled, is 110 Mg (121 tons). The slag cover may be about 300 mm. (11.8 in.) thick.

The molten steel in the ladle is stirred with an inert gas, e.g. nitrogen introduced through a top lance having a porous plug and which is immersed into the steel in the ladle. Stirring may continue for several minutes (e.g. 9 minutes). The temperature of the molten steel in the ladle will drop during stirring, e.g. from a temperature of about 2870° F. (1577°C.) at the start of the stir to a temperature of about 2850° F. (1566°C.) at the end of the stir. The post-stir temperature depends upon the volume of molten steel in the ladle, the rate at which the inert gas is introduced into the ladle, and the length of the stir. After stirring, the steel is withdrawn from the ladle into ingot molds or into the tundish of a continuous casting apparatus.

The length of time the molten steel spends in the ladle during the casting period is 30-90 minutes, for example. In methods conducted in accordance with the prior art, bismuth fade during this period can be 50-90%. In accordance with the present invention, bismuth fade is essentially non-existent.

Bismuth fade is not the same as bismuth recovery which may be no greater than 50% even when employing the present invention. Recovery is a measure of the bismuth content in the final, solidified steel product compared to the total amount of bismuth added to the molten steel in the ladle. Recovery reflects bismuth losses before, during (and possibly after) the casting period. Fade, on the other hand, reflects only the difference between (a) the bismuth content at the beginning of the casting period and (b) the bismuth content at the end of the casting period.

The foregoing detailed description has been given for clearness of understanding only, and no unnecessary limitations should be understood therefrom, as modification will be obvious to those skilled in the art.

We claim:

1. In a process wherein bismuth is added to molten steel at a ladle into which the steel is introduced, and there is a transport of said bismuth from the molten steel in the ladle to the atmosphere above the molten steel where the bismuth vaporizes to provide a bismuth vapor pressure, a method for preventing a substantial decrease in the bismuth content of the molten steel, while the molten steel is in the ladle, said method comprising the steps of:
   reducing the transport rate of bismuth from said molten steel to the atmosphere above the molten steel in the ladle;
   and reducing the partial pressure due to bismuth, above said molten steel;
   said steps of reducing the partial pressure due to bismuth and reducing said transport rate comprise covering the surface of said molten steel with a slag layer having a thickness and solidification temperature sufficient to perform said steps.

2. A method as recited in claim 1 and comprising:
   maintaining said slag layer thick enough so that the top of the slag layer cools and forms a crust.

3. A method as recited in claim 2 wherein:
   said slag layer is at least about 2 in. (51 mm.) thick and solidifies at a temperature in the range of about 1300°-1400° C. (2372°-2552° F.).

4. A method as recited in claim 1 wherein:
   the ratio of surface area to volume of the bismuth-containing molten steel in the ladle, before the ladle is tapped, is no greater than about 0.8 $m^2/m^3$ (0.25 $ft.^2/ft.^3$).

5. A method as recited in claim 1 wherein:
   said slag layer substantially reduces the bismuth concentration, at a location between the top of said molten steel and the atmosphere above said slag layer, to less than the bismuth concentration existing at the top of the molten steel, thereby reducing the partial pressure due to bismuth, above the slag layer, to less than that which would exist above the molten steel absent said slag layer.

6. A method as recited in claim 5 wherein:
   said slag layer substantially reduces the temperature of bismuth undergoing transport through said slag layer so that the temperature of the bismuth at the time it contacts the atmosphere above the slag layer is substantially below the temperature existing at the top of said molten steel, thereby reducing the partial pressure due to bismuth, above the slag layer, to less than that which would exist above the molten steel absent said slag layer.

7. A method as recited in claim 1 wherein:
   said slag layer substantially reduces the temperature of bismuth undergoing transport through said slag layer so that the temperature of the bismuth at the time it contacts the atmosphere above the slag layer is substantially below the temperature existing at the top of said molten steel, thereby reducing the partial pressure due to bismuth, above the slag layer, to less than that which would exist above the molten steel absent said slag layer.

8. A method as recited in claim 7 wherein:
   said slag layer solidifies at a temperature in the range 1300°-1400° C. (2372°-2552° F.); and
   said slag layer is thick enough so that the top of the slag layer cools and forms a crust.

9. A method as recited in claim 1 wherein said step of reducing the partial pressure due to bismuth comprises:
   reducing the bismuth concentration at a location above the top of said molten steel to less than that existing at the top of said molten steel;
   and reducing the temperature of the bismuth at the time it contacts the atmosphere to substantially below the temperature existing at the top of said molten steel.

10. A method as recited in claim 9 wherein:
    said temperature of the bismuth at the time it contacts the atmosphere is no greater than about 1400° C. (2552° F.).

11. A method as recited in claim 10 wherein:
    said temperature of the bismuth at the time it contacts the atmosphere is no greater than about 1300° C. (2372° F.).

* * * * *